United States Patent
Lin et al.

(10) Patent No.: US 7,970,943 B2
(45) Date of Patent: Jun. 28, 2011

(54) PROVIDING INTEROPERABILITY IN SOFTWARE IDENTIFIER STANDARDS

(75) Inventors: David Cheng-Fang Lin, Palo Alto, CA (US); Mark Edward Wilcox, Little Elm, TX (US)

(73) Assignee: Oracle International Corporation, Redwood Shores, CA (US)

( * ) Notice: Subject to any disclaimer, the term of this patent is extended or adjusted under 35 U.S.C. 154(b) by 337 days.

(21) Appl. No.: 11/838,537

(22) Filed: Aug. 14, 2007

(65) Prior Publication Data

US 2009/0049200 A1 Feb. 19, 2009

(51) Int. Cl.
*G06F 15/16* (2006.01)
*G06F 7/00* (2006.01)
*G06F 17/30* (2006.01)

(52) U.S. Cl. .......................... 709/246; 707/602; 707/809

(58) Field of Classification Search .................... 709/246
See application file for complete search history.

(56) References Cited

U.S. PATENT DOCUMENTS

| | | | |
|---|---|---|---|
| 5,530,844 A | 6/1996 | Phillips et al. | |
| 5,574,903 A * | 11/1996 | Szymanski et al. | 1/1 |
| 5,694,598 A * | 12/1997 | Durand et al. | 707/103 R |
| 5,706,506 A * | 1/1998 | Jensen et al. | 707/103 R |
| 6,016,499 A * | 1/2000 | Ferguson | 707/104.1 |
| 6,237,053 B1 * | 5/2001 | Herrod et al. | 710/65 |
| 6,256,740 B1 | 7/2001 | Muller et al. | |
| 6,279,015 B1 * | 8/2001 | Fong et al. | 715/239 |
| 6,415,280 B1 * | 7/2002 | Farber et al. | 707/2 |
| 6,430,177 B1 | 8/2002 | Luzeski et al. | |
| 6,487,278 B1 | 11/2002 | Skladman et al. | |
| 6,754,649 B2 * | 6/2004 | Fujimura | 707/1 |
| 6,952,717 B1 * | 10/2005 | Monchilovich et al. | 709/205 |
| 7,024,693 B2 * | 4/2006 | Byrne | 726/21 |
| 7,194,516 B2 | 3/2007 | Giacobbe et al. | |
| 7,251,681 B1 * | 7/2007 | Gourlay | 709/214 |
| 7,764,669 B2 * | 7/2010 | Mills et al. | 370/352 |
| 7,788,111 B2 * | 8/2010 | Haskell et al. | 705/2 |
| 2002/0007375 A1 * | 1/2002 | Ebata | 707/513 |
| 2002/0044655 A1 * | 4/2002 | Applebaum | 380/45 |
| 2002/0095454 A1 | 7/2002 | Reed et al. | |
| 2002/0161749 A1 * | 10/2002 | Pratt | 707/3 |
| 2003/0115218 A1 * | 6/2003 | Bobbitt et al. | 707/200 |
| 2003/0120665 A1 * | 6/2003 | Fox et al. | 707/100 |

(Continued)

OTHER PUBLICATIONS

P. Leach et. al., A Universally Unique IDentifier (UUID) URN Namespace, RFC 4122, Jul. 2005.*

(Continued)

*Primary Examiner* — Rupal D Dharia
*Assistant Examiner* — Robert Shaw
(74) *Attorney, Agent, or Firm* — Silicon Valley Patent Group LLP; Omkar Suryadevara

(57) ABSTRACT

A system manages information exchanges between components of the system so that information is provided in a format expected by each particular component. In a specific implementation, a translation service provider intercepts information exchanges between client and data sources or data services and translates of converts software identifiers (e.g., UUIDs or GUIDs) as needed so that the client or data source can properly process the data. For example, a client may use GUIDs in a first format, and when information is requested is presented using a GUID in a second format, different from the first, the translation service provider translates a GUID to the first format. The translation service provider may be transparent to the other components of the system.

26 Claims, 4 Drawing Sheets

U.S. PATENT DOCUMENTS

| | | | |
|---|---|---|---|
| 2003/0140058 A1* | 7/2003 | Martin et al. | 707/103 R |
| 2003/0172127 A1* | 9/2003 | Northrup et al. | 709/219 |
| 2003/0204510 A1* | 10/2003 | Ball et al. | 707/100 |
| 2003/0225789 A1* | 12/2003 | Bussler et al. | 707/104.1 |
| 2004/0098546 A1* | 5/2004 | Bashant et al. | 711/156 |
| 2004/0153499 A1* | 8/2004 | Heddaya et al. | 709/202 |
| 2004/0177082 A1* | 9/2004 | Nitta et al. | 707/100 |
| 2005/0055369 A1* | 3/2005 | Gorelik et al. | 707/102 |
| 2005/0132342 A1* | 6/2005 | Van Lunteren | 717/143 |
| 2005/0223023 A1* | 10/2005 | King | 707/102 |
| 2005/0246527 A1* | 11/2005 | Gottwald | 713/168 |
| 2006/0009996 A1* | 1/2006 | Lipscomb et al. | 705/1 |
| 2006/0165119 A1* | 7/2006 | Dugan et al. | 370/466 |
| 2006/0173873 A1* | 8/2006 | Prompt et al. | 707/100 |
| 2006/0195426 A1* | 8/2006 | Ishii et al. | 707/3 |
| 2006/0235811 A1* | 10/2006 | Fairweather | 706/12 |
| 2006/0248052 A1* | 11/2006 | Zurek | 707/3 |
| 2007/0005801 A1* | 1/2007 | Kumar et al. | 709/238 |
| 2007/0055891 A1* | 3/2007 | Plotkin et al. | 713/189 |
| 2008/0154617 A1* | 6/2008 | Fischer | 705/1 |

OTHER PUBLICATIONS

Sun Microsystems, Inc., XDR: External Data Representation Standard, RFC 1014, Jun. 1987.*

Y. Shafranovich, Common Format and MIME Type for Comma-Separated Values (CSV) Files, RFC 4180, Oct. 2005.*

CodeProject—Hex String to Integer Conversion Jan. 2001 http://www.codeproject.com/KB/string/hexstrtoint.aspx.*

Leach et. al., A Universally Unique IDentifier (UUID) URN Namespace, RFC 4122, Jul. 2005.*

Shafranovich, Common Format and MIME Type for Comma-Separated Values (CSV) Files, RFC 4180, Oct. 2005.*

* cited by examiner

PROVIDING INTEROPERABILITY IN SOFTWARE IDENTIFIER STANDARDS

BACKGROUND OF THE INVENTION

This invention relates to the field of software information identification and more specifically to techniques for providing interoperability between different software identifier formats.

In software environments, it is important to be able to identify information without significant amounts of centralized coordination. An identifier standard known as the Universally Unique Identifier (UUID) standard was developed and a particular implementation is the Globally Unique Identifier (GUID) standard. GUID is a mechanism used to uniquely identify electronic objects via a static identifier (similar to an electronic serial number) in databases or directories.

Despite the widespread adoption of UUIDs and GUIDs, a problem with the GUID system is that the identifiers may be in many formats that are different and distinct from each other. Formats lack transparency and interoperability. While many applications can generate and store information in a GUID format, the information is often stored in GUID in a proprietary format, even if the information has the same values. For example, Microsoft stores GUIDs in a completely different format from Oracle's.

Because different formats are used, this leads to interoperability problems between software platforms. An application developed expecting a particular GUID format is likely not compatible with an application or data source using another GUID format. In fact, using an application with information in a GUID format the application does not expect will likely produce incorrect or erroneous results. The user of the application may not even be made aware that an error has occurred because the application does not recognize there was a problem with the information.

Further, when data from multiple systems are aggregated with, for example, a virtual directory, this can cause problems because client applications may be expecting a GUID to be presented and in a particular format which is different than the actual source system. Some of the systems being integrated might not even use GUID. If a client application relies on GUID, the client application will only work properly with the services that provide GUID. In the integrated environment, such as with a virtual directory environment, if any of the back-end systems cannot provide GUID, or if the GUID provided are not in the same data type and format, then the client applications will not be able to utilize GUID.

Therefore, there is a need for a technique for providing interoperability between the different UUID and GUID formats.

BRIEF SUMMARY OF THE INVENTION

A system manages information exchanges between components of the system so that information is provided in a format expected by each particular component. In a specific implementation, a translation service provider intercepts information exchanges between client and data sources or data services and translates or converts software identifiers (e.g., UUIDs or GUIDs) as needed so that the client or data source can properly process the data. For example, a client may use GUIDs in a first format, and when information is requested is presented using a GUID in a second format, different from the first, the translation service provider translates a GUID to the first format. The translation service provider may be transparent to the other components of the system.

In an implementation, the invention is a method including: intercepting a request from a client for data stored at a first data source; determining a data source where the data resides, where the data does not necessarily reside at the first data source; retrieving the data from a second data source, different from the first data source; determining if a first identifier format of a first identifier associated with the data from the second data source is different from a second identifier format expected by the client; and if the first identifier format is different from the second identifier format, converting the first identifier into the second identifier format.

After converting the first identifier into the second identifier format, the data and associated first identifier in the second identifier format are sent to the client. The method may include accessing a map indicating an identifier format associated with each data source in a system. The method may include accessing a map indicating an identifier format associated with each client in a system.

In a specific implementation, the first identifier format is a string of i hexadecimal characters. The second identifier format is a string of j hexadecimal characters including k separator characters, where j is greater than i. Converting the first identifier into the second identifier format may include inserting the separator characters at j different positions in the first identifier in the first identifier format.

In a specific implementation, the first identifier format is a string of i hexadecimal characters including j separator characters. The second identifier format is a string of k hexadecimal characters, where i is greater than k. Converting the first identifier into the second identifier format may include removing the j separator characters from the first identifier in the first identifier format.

In a specific implementation, converting the first identifier into the second identifier format includes: dividing a n-bit value of a first identifier in the first format into m first bytes, where each first byte has p bits; type casting each first byte into an integer; performing a logical AND operation on each first byte with 0xFF to obtain resulting second bytes; converting each second byte into two hexadecimal characters; and concatenating the hexadecimal characters into a string of hexadecimal characters.

In a specific implementation, converting the first identifier into the second identifier format includes: dividing n characters of hexadecimal string into n/2 pairs of two-hexadecimal substrings; converting each of the two-hexadecimal substrings to an integer; converting each integer into a byte value; and forming a (n/2)-byte value with the n/2 converted bytes.

In an implementation, the invention is a system including: a client, expecting data using a first software format; a first data source, providing data using the first software format; a second data source, providing data using a second software format, different from the first software format; and a translation service provider, receiving requests from the client for data which resides on the first or second data source. The translation service determines whether the data resides on the first or second data source, and when the data resides on the second data source, converting data retrieved from the second data source into the first software format.

The first and second data sources may be databases. The first and second data sources may be different directory services. The translation service provider may be a service provided by or part of a virtual directory program. In an embodiment, requests by the client are directed to the first data source and such requests are intercepted by the translation service provider, without knowledge of the client. The first software format is a first format for a GUID and the second software format is a second format for a GUID, where the second format for a GUID is different from the first format for a GUID.

In an implementation, the invention is a computer program product stored on a computer-readable medium including: code for receiving from a first data source a first unique identifier in a first format; code for translating the first unique identifier to a second format; and code for sending the translated first unique identifier to a first client.

Further, the product may include: code for receiving from a second data source a second unique identifier in a third format; code for translating the second unique identifier to a fourth format; and code for sending the translated second unique identifier to a second client.

As an example, the code for translating the first unique identifier to a second format may include code for inserting separator characters into the first unique identifier in the first format. The first unique identifier may be a GUID or UUID. The first data source may be a database, directory, or data service. The code for translating the first unique identifier to the second format may be stored at the first data source. In other words, a translation service of the invention may be integrated with the data source (or integrated with any other component of an information system).

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
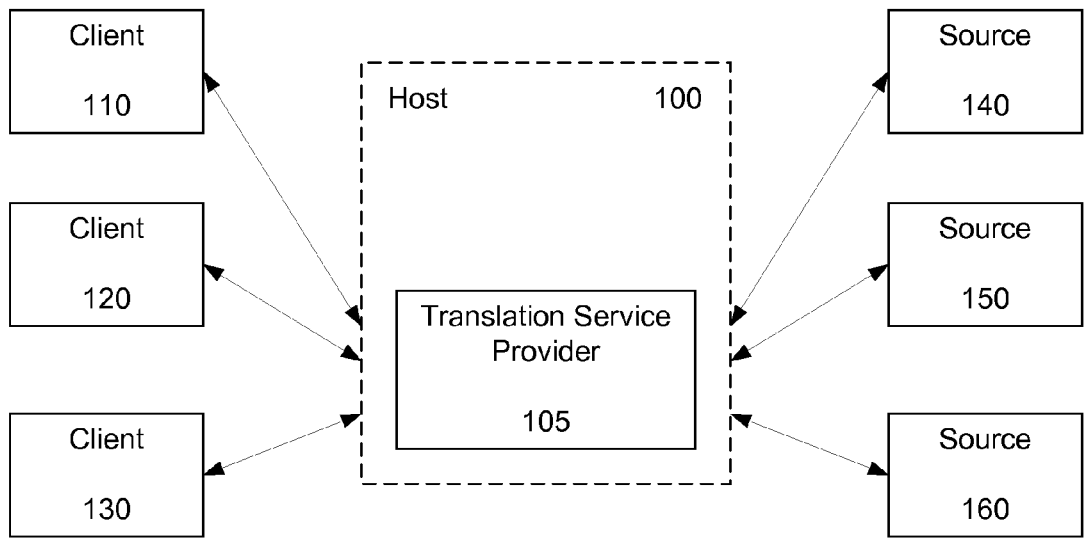
FIG. 1 shows a block diagram of a system including a translation service provider.

FIG. 1 shows a system of the present invention. This specific implementation includes a host 100; clients 110, 120, and 130; and data sources or data services 140, 150, and 160. The host includes a translation service provider 105. Clients 110, 120, and 130 are connected to the host. Data sources 140, 150, and 160 are also connected to the host. Any of the clients may connect to any of the data sources through the host. Any one of the sources may serve data to any client through the host. In other implementations, there may also be a one or more direct paths between a source and a client which does not pass through the host.

In a specific embodiment of the invention, the translation service provider receives from a data source a software identifier in a first format, translates the software identifier in the first format into a software identifier in a second format, and sends the software identifier in the second format to a client. More details of the operation of the system and translation service provider are discussed below.

Three clients are shown in the figure, but a system can have any number of clients. For example, there may be 1, 4, 5, 8, 16, 32, 50, 128, 250, 512, 1024, 5000, 10,000, 50,000, or more clients. There are many different client types: computer, supercomputer, desktop computer, notebook computer, personal digital assistant, mobile telephony device (e.g., smart phone, cellular telephone), a portable device that stores or plays music, photos, or video, or a combination of these, network appliance, network router, radio frequency identification (RFID) tag, RFID reader, and other electronic or communication device. A system may include clients which are the same. Or a system may include different types of clients in any combination.

Three data sources or data services are shown in the figure, but a system can have any number of data sources. For example, there may be 1, 2, 4, 8, 16, 32, 50, 100, 500, 1024, 5000, 10,000, 50,000, or more sources. These data sources may be any source of information. There are many different data source or data service types: database, virtual database, directory, virtual directory, directory synchronization, web service, data file, client that provides data, and miniature holder of limited information such as a RFID tag. In some embodiments, a client may be a data source to itself or other clients. A system may include data sources or data services which are the same. Or a system may include different types of data sources or data services in any combination.

Further, a client application may become a data source if that client provides data or data storage to another client processing the data. Similarly, a data source in one application may be a client in another, where that source processes data provided by or stored in another data source.

The clients and data sources are connected to host and translation service provider using wired or wireless connections, or any combination of these. For example, some clients may be connected wirelessly while others are connected through a wired. A single connection may include a combination of wired and wireless segments. Some examples of wired connections include: Ethernet, Internet, intranet, parallel, serial, USB, local area network, wide area network, telephone connection, dedicated connection, and system area network. Some examples of wireless connections include: infrared, LED, Wi-Fi (e.g., IEEE 802.11, 802.11a, 802.11b, 802.11e, 802.11g, 802.11i, and 802.11n), WiMax (e.g., IEEE 802.16, 802.16a, 802.16c, 802.16d, and 802.16e), Bluetooth, wireless USB, near field communication (NFC), satellite, cellular, mobile phone, and other radio frequency (RF) protocols.

Figure 2:
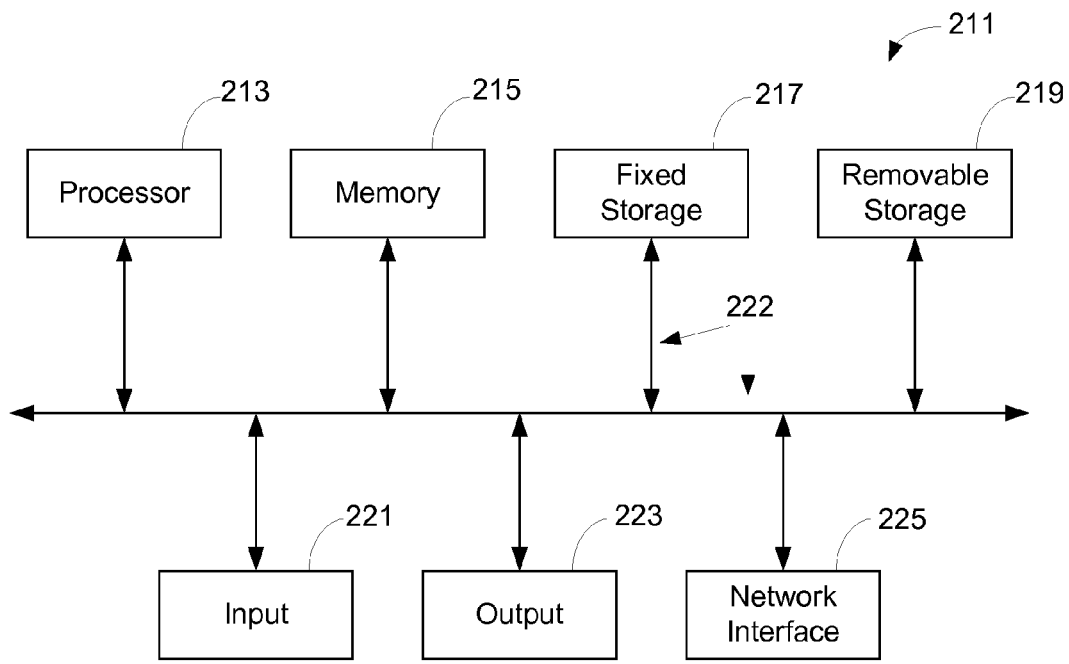
FIG. 2 shows an electronic system that may be used in implementing a system of the invention.

FIG. 2 shows an electronic system 211 that may be used in implementing a system of the invention. For example, a client device may include any one block or combination of the blocks shown. A data source or data service may include any one block or combination of the blocks shown. The host may include any one block or combination of the blocks shown. For example, the translation service provider may be implemented in software that executes on the electronic system.

System 211 includes a processor 213, memory 215, fixed storage 217, removable storage 219, input 221, output 223, and network interface 225. Electronic system 211 may have additional or fewer subsystems than that shown. For example, a system may include more than one processor (i.e., for a multiprocessor system), or the system may include a cache memory.

Arrows such as 222 represent the system bus architecture of system. However, these arrows are also illustrative of any interconnection scheme serving to link the subsystems. For example, the network interface could be connected to another subsystem through a port or have an internal connection to the memory.

The processor may be a dual core or multicore processor, where there are multiple processor cores on a single integrated circuit. The processor executes instructions, typically provided in the form of a computer program. A processor typically has integrated cache memory. The system utilizes the memory to store instructions or computer code and data.

Fixed and removable storage devices 217 and 219 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Input device 221 allows a user to interface with the system. The input device may be a keyboard, a mouse, buttons, dials, or any other suitable input mechanism. Output device 223 generally allows the system to provide output to the user. Some examples of output devices include, but are not limited to, monitors, display screens, LCDs, LEDs, and printers.

Network interface 225 typically allows the system to interface with a network to which it is connected. Additional peripherals may be connected to the system through the network interface or another interface such as serial, parallel, or universal serial bus (USB) interfaces (not shown).

The system may be part of a distributed computing environment. In a distributed computing environment, individual computing systems are connected to a network and are available to lend computing resources to another system in the network as needed. The network may be an internal Ethernet network, Internet, or other network.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on a mass storage device. The source code of the software of the present invention may also be stored or reside on mass storage device (e.g., hard disk, magnetic disk, tape, or CD-ROM). As a further example, code of the invention may be transmitted via wires, radio waves, or through a network such as the Internet.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a computing environment may use a different operating system from other computers in the same computing environment.

Figure 3:
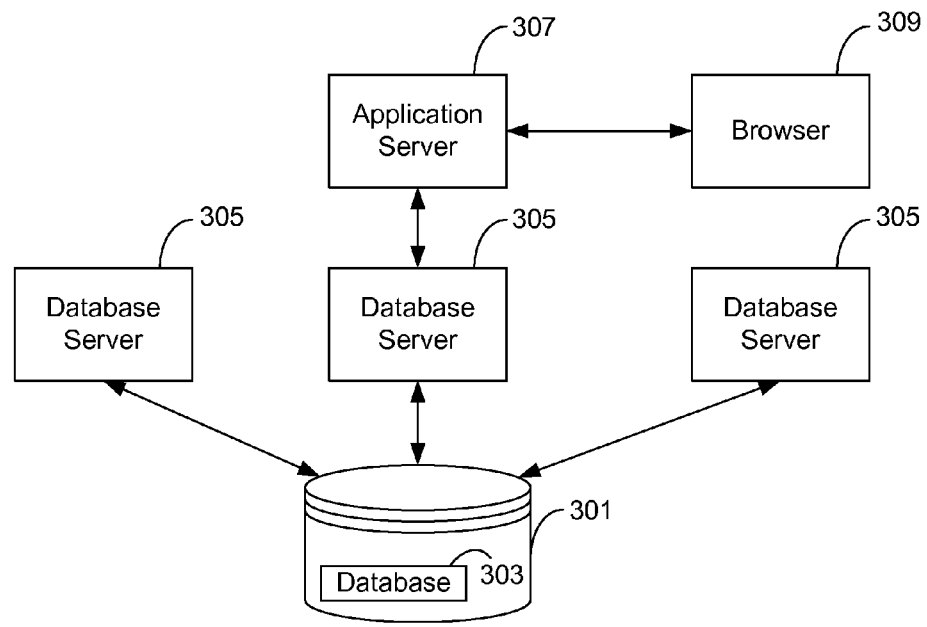
FIG. 3 shows data source or data service in the form of a database system.

FIG. 3 shows a data source or data service in the form of a database system. A database may be part of a database management system. One suitable database management system architecture is a three-tiered architecture as shown.

In a first tier is the core of a database management system, a central storage 301 that holds or stores a database or repository 303. The database is typically stored using one or more hard drives, and is generally part of a larger computer system. The information may be stored in the database in a variety of formats with relational database management systems (RDMS) relying heavily on tables to store the information.

In a second tier are database servers 305. The database servers are instances of a program that interacts with the database. Each instance of a database server may, among other features, independently query the database and store information in the database. In some instances, the database servers 305 may not include user friendly interfaces, such as graphical user interfaces.

In a third tier is at least one application server 307. The application service may provide the user interfaces to the database servers. By way of example, the application server may be a web application server on the Internet, or any other network. The application server may also be a virtual database server or a virtual directory server. The application server may provide user friendly mechanisms for accessing the database through the database servers. A web browser 309 may be utilized to access the application server.

Data sources are generally designed to serve specific applications or clients. For example, an LDAP directory is designed to serve directory applications and a relational database is designed to serve applications that require database access instead of directory access.

Translation Service Provider

Returning to FIG. 1, host 100 with the translation service provider 105 is connected between clients and a data sources or data services and provides software identifier translation services. The translation service provider takes software identifiers in one format and translates them into another format.

A client may request to receive data from one or more data sources that provide the data along with GUIDs in one or more formats. One or more data sources may store data in a protocol different from that the requesting client is able to handle. Each client may also be implemented to accept GUIDs in specific format, and different clients may accept different formats. On the reverse direction of communication, a client requests to store information that contains GUIDs in one or more client-specific formats that may or may not be the formats stored in the back-end data sources. A client may also send data in a protocol different from that of the destination data source. The translation service provider will make translations or conversions as needed to provide information in an appropriate or expected format. More detail is provided below.

One or more data sources may also provide data that does not include GUIDs or accept data to store without GUIDs. In some embodiments, one or more data sources may be requested to start storing GUIDs in a certain format. The data stores may respond with one or more formats they are able to handle and start storing GUIDs in one of those formats. A data source that already stores GUIDs in an existing format may be requested to start storing GUIDs in a new format. The translation service provider will make translations or conversions as needed to provide information in an appropriate or expected format. More detail is provided below.

There may be one or more translation service providers deployed in a system or application. In some embodiments, the translation service provider may provide translation to data flowing in both directions (i.e., from data sources to clients and from clients to data source). In other embodiments, a translation service provider provides translation only to data flowing in one direction, where two or more translation service providers are deployed to provide translation in different directions of communication.

The following is a specific flow implementation of the invention. Specific implementations of flows are presented in this patent, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

1. A client requests data from one or more data sources or data services. Without the translation service provider, the client's request would be directly sent to the data source and the data source will return the requested information and software identifier.

However, clients are not designed to handle incompatible servers or data sources. When a client requests information from a source, the client typically expects the information from the source in a certain protocol and certain format. For example, a source provides data in a relational database protocol and some fields of data, such as GUIDs in a specific format (i.e., format A). The client expects the GUIDs in format A and when received, can appropriately execute a client application, process data, or other performs an operation based on the received GUIDs.

Another source may provide GUIDs in another specific format (i.e., format B). If a client does not expect GUIDs in a different format (format B), it will perform operations based on the expected format, for example, format A. Thus, the client may perform the operation incorrectly, improperly, give an error message, process data and give an incorrect result, or other potential undesirable outcomes. The client may not even recognize that it processed something incorrectly, and the user may never be notified. Also, when information is provided in a format that a client does not expect, this may cause a client to shutdown, crash, or even cause an entire system to crash.

Similarly, servers or data sources are generally not designed to be communicating with applications that do not use the same data protocol and data format. For example, a directory server, such as an LDAP server, is not generally designed to connect to and communicate directly with a client that communicates in a different protocol, such as a relational database protocol. A client request that is in a protocol incompatible with the server or data source will cause unintended consequences, such as crashing the server, corrupting the data, and disrupting the server's services to other clients.

Even when clients and data sources are communicating in the same protocol, inoperability problems still exist when the data provided by the sources is not in the same format expected by the clients. Similarly, when a client sends data to be stored in a source, the source generally, by design, accepts data in a certain format. If the client's format and the source's format are different, unintended consequences may occur to the client, the source, both the client and the source, or even to the entire system.

2. The translation service provider intercepts and handles the data request from the client. In a specific embodiment of the invention, the intercept and handling may be transparent to the client. The client is not necessarily aware that the data request has been intercepted by the translation service provider, and that the request is not being handled by the data source or data service directly. This allows a translation service provider feature to be deployed without needing to change or update software on a large number of clients and data sources. As can be appreciated, there is difficulty in upgrading the software of a system having large numbers of clients and data sources.

To be sure, transparent services deployed between the clients and servers or data sources are desirable solutions to the inoperability problems. Transparent services solve both the protocol inoperability and format inoperability problems. A transparent service, for example, translates mismatch protocols on the data flowing from a source to a client. On the reverse direction, translates mismatch protocols on the requests and data flowing from a client to a source. In applications where a client simultaneously or in turns communicates with more than one source or requests data from more than one source, protocol translations are performed between the client and all the sources.

3. The translation service provider determines which data source has data the client is requesting and requests the data from the appropriate data source. If there is only one data source, this step in the flow is not needed and the translation service provider can immediately request data from the single data source.

In many systems, however, data resides on one of multiple data sources. For example, some data may be held in one database system while other data is held in another database system. Two database systems may be completely different from each other. They may use different access protocols or use different software identifier formats (i.e., different GUID or UUID formats), or both. In an implementation of the invention, the translation service provider maintains or has access to a data source map showing where the data requested by the client resides.

Furthermore, the translation service provider or another service provider determines whether the requests or the accompanying data, or both, from the client are in the protocols and formats of the data sources. If not, the translation service provider translates these requests and accompanying data into the protocols and formats of the data sources. The translated requests and accompanying data are then sent to the data sources. Then the translation service provider obtains, pulls, retrieves, or otherwise requests the information from the data sources. The data sources then return some data to satisfy the requests.

4. The translation service provider receives the requested data from the appropriate data source. For example, in the case the data source uses a software identifier scheme, the data is received with a software identifier (such as a GUID) in a first format.

5. The translation service provider determines which data format the client who requested the data expects to receive the data in. In an implementation of the invention, the translation service provider maintains or has access to a client map (e.g., a client software identifier format map) indicating which format a particular client expects the data format to be in.

6. Determine whether a translation or conversion of the data is needed. The translation service provider knows what format the data from the data source is in and also which format the client expects. A translation or conversion is needed when the data is in a format the client does not expect. If the format of the data is in the same format the client expects, no translation or conversion is needed. The translation service provider can send the data to the client without any translation.

7. If needed, perform a translation of the data to the format the client expects. When the data is in a format the client does not expect, the translation service provider performs the appropriate translation of the data and sends the translated data to the client.

For example, the translation service provider translates or converts from a first GUID format to a second GUID format, where the second GUID format is expected by a client device. The translation service provider translates or converts from one UUID format to another UUID format, where the second UUID format is expected by a client device.

The clients of a system may expect data in different protocols and formats from the protocols and formats returned from the sources. For example, client 110 expects information in format A and client 120 expects information in format B. The translation service provider receives the data returned from the sources and translates the data into the protocols and formats of the requesting clients as needed. The translation service provider sends translated data, now in the protocol and format expected by the requesting clients, to the appropriate requesting client.

As can be appreciated, the system of the invention greatly improves interoperability of devices (clients and data sources or data services) in a system. The translation service provider enables clients and sources that do not "speak" the same protocols and formats to communication without requiring any changes to a client or a data source.

To resolve data format inoperability, the translation service or another translation service provides translation on the data format. According to an embodiment of the present invention, a translation service performs translation of GUIDs from one format to another format. In cases where both protocol inoperability and format inoperability exist, a translation service provider or separate translation service providers may perform the protocol translation and the format translation. In other cases, only one of the translation, protocol or data, may be needed. For example, when data protocol is the same between a client and data source, but the GUIDs stored in the source are in a format different from that expected by the client.

In an embodiment of the invention, the translation service provider performs translations of data between one or more sources and a client. The client may not even recognize that its communications to the sources are transparently intercepted and serviced upon. To the client, it is communicating directly to the sources that provide data in the client's protocol and format. In actuality, one or more data sources may provide data in a different protocol or format. Data that is not in the client's protocol or format is automatically, transparently, and dynamically translated before passing it on to the client. The client may believe it is receiving the information directly from a source, when in actuality it is being translated and passed through the translation service provider.

Similarly, data sources connected to the translation service provider may not realize that they are not communicating to clients directly. To these sources, they are connecting and communicating to clients that use the same data protocol and format. In actuality, the clients do not need to be in compliance to both protocol and format. When client requests do not comply with the data sources' protocols and formats, the translation service provider translates the requests to the protocols and formats before passing to the sources.

The translation service provider has the capabilities to determine the data protocol as well as data format used by each client and each data source. In an embodiment, the translation service provider has a list or directory of the connected clients and a list or directory of the connected data sources. Further, the translation service provider has the knowledge of what data protocols and formats are used by each client and each source.

The translation service provider may form the knowledge regarding the clients, data sources, and their protocols and formats automatically through some mechanism of auto detection. In alternative or in addition, an administrator of the translation service provider or its host may configure the translation service provider to add the knowledge. For example, the administrator may create a mapping of where data is stored (e.g., which source) and what protocol and format the data is in.

When, for example, client 130 requests certain data, the translation service provider will be able to determine in which source this data is held and whether any translation service is required to service this client. If the data is not held in any of the sources, the translation service provider can send an appropriate warning or error message that the data is not available or not found. Sources may be connected to different ports, network locations, and means. The knowledge or mapping may, itself, be held in a file, database table, array, look-up table, or other data structure.

In some embodiments where clients and data sources are frequently added or are changed periodically, the mapping of clients to data sources and the knowledge of data protocols and formats may be generated on the fly. The translation service provider or its host may send out queries to the network or system to determine how many clients and data sources are connected, what types of clients and data sources are connected, or what protocols and formats the clients and data sources communicate in. The translation service provider then creates a mapping of clients and data sources and the protocols and formats these clients and data sources use.

In another embodiment, the translation service provider or its host may perform the determination of clients on demand. For example, when client 120 sends a request to a data source, the translation service provider intercepts the request, and from the request, determines which client is communicating with which data source. Also from the request, the translation service provider determines what data protocol and format are used by this client. In some cases, a client's request may not contain enough information to effect a successful determination. In such cases, the translation service provider or its host may send a warning message or error message back to the client. In addition or in the alternative, the translation service provider or its host may notify the administrator through established notification mechanisms.

In some embodiments, a client communicates only in one protocol and expects and accepts data in only one format. In other embodiments, a client may be capable to communicate in two or more data protocol and accepts data in two or more formats. In an embodiment, the translation service provider or its host communicates to the client in one protocol and one format only. In other implementation, the translation service provider or its host may communicate to the client in any protocols and formats the client accepts.

In some embodiments where translations are likely required between a client and a data source, the translation service provider performs the one or both of the translations to all data flowing through it. In other embodiments, especially in a system where more than one client or more than one source is connected to the system, one or both translations may not be needed to some of the data flow. In such embodiments, the translation service provider, as discussed above, knows which clients and sources are connected and what protocols and formats they use. The translation service provider may provide the translation services only as needed. For example, when client 110 (format A) requests data from source 140 (also format A), format translation is not needed. Data from source 140 is passed straight to client 110. However, when client 110 requests data from source 150 (format B) or 160 (format C), the translation service provider translates data to format A before passing the data to client 110.

The translation service provider provides translation service to the clients and data sources. Regarding GUIDs, the translation service provider translates GUIDs from one format to another. The translation service provider translates GUIDs from the formats stored by the data sources into the formats expected and accepted by the client applications. For client requests to receive information, the translation service provider dynamically translates, if needed, GUIDs to the client-specific formats. In the reverse direction, the translation service provider translates GUIDs from the client-specific formats to the formats stored by the data sources. For the requests to store information with GUIDs, the translation service provider dynamically translates, if needed, GUIDs to the formats stored by the data sources.

FIG. 1 shows only a single translation service provider 105 to represent the functionality of the translation service. However, multiple machines may be used to provide the functionality of the translation service provider. Typically, as the number of clients and data sources increases, there will be greater numbers of machines running the translation service in order to handle the increased load.

In an implementation, the host is a server, computer, or machine that is a dedicated translation service provider. As a dedicated translation service provider, the machine would not provide other services or functions. In another implementation, the host providing the translation service also provides other services. For example, the host may be a database server, a virtual server, a virtual directory, or any application other than a client or data source, or a combination, and the translation service provider also runs on the host with another service.

For example, the host may be a directory. A directory, as compared to a conventional database, is heavily optimized for reading, with the assumption that data updates are very rare compared to data reads. Commonly, a directory supports search and browsing in addition to simple lookups. A specific example of a directory product is the Oracle Internet Directory (OID).

The host may be a virtual directory or virtual database. A virtual directory is a server for a directory protocol such as LDAP, but unlike a traditional directory server, does not own the data itself in its own database. Instead a virtual directory will dynamically translate requests it receives to operations in LDAP or other protocols or data models, such as to a relational database. A specific example of a virtual directory product is the Oracle Virtual Directory (OVD).

A virtual directory allows client applications that only have the capability to connect to a single service to have access to multiple services. A client connects to the virtual directory as a single service. The virtual database or virtual directory dynamically translates client requests it receives in LDAP, DSML or other protocols to the data models or protocols understood by the underlying data sources such as a relational database. On return, the virtual database or virtual directory passes the data from these data sources to the requesting clients. The translation service provider provides the automatic, dynamic translation of GUID formats to the clients and the underlying data stores.

In a specific embodiment, the host is a virtual directory (e.g., Oracle Virtual Directory) that includes the translation service provider. A first client is a web application and there may be more than one web application. A second client is a portal and there may be more than one portal. A third client is any application that manages access to data and there may be more than one access manager. There may be other client applications connected to the virtual directory.

Client applications communicate with the virtual directory. If translation service is required on the information passing through the virtual directory, the information is passed to the translation service provider. Translated information may be passed back to the virtual directory or directly to the intended destinations. No change to any of the client applications is required to utilize the translation service. So, the translation service is transparent to users and clients.

In an embodiment, the translation service provider is attached to or hosted by a database or directory server. For example, a directory may be an operating system directory such for Microsoft Windows; e-mail directory such as Lotus Notes or Microsoft Exchange; user information directory such as by PeopleSoft, Oracle E-Business Suite, or SAP; general-purpose LDAP directory such as the Oracle Internet Directory (OID), Sun Java System Directory Server, Novell eDirectory, IBM iSeries Directory Server, or Microsoft Active Directory; or a directory from vendors such as iPlanet, eDirectory, and OpenLDAP.

Providing the translation service outside the client applications, for example, in hosted by a directory or virtual directory, allows the client applications to concentrate on different application-specific formats of GUIDs yet still has access to data stores that provide GUIDs in different formats. Similarly, the back-end data sources are not required to generate and store GUIDs in any application-specific formats.

Furthermore, aspects of a translation service provider of the invention may be embodied in other software applications, services, or firmware. For example, a database server, virtual database server, virtual directory, naming server, disk access software, data access software, document management access software, or other software module or program may include translation service functionality to allow, for example, translating from one GUID format to another GUID format. The software or firmware may be implemented using embedded code. The software or firmware may be run on any type of computing device including computer, supercomputer, notebook or laptop computer, personal digital assistant, mobile telephony device, smart phone, wireless communications device, computer server, network appliance, network router, or other electronic device.

In an implementation, the translation service provider is integrated in one or more client applications. For example, a translation service provider may be implemented as a module, plug-in, or widget for a client application. The plug-in may be pushed or downloaded to a client and then installed. The translation service provider may also be integrated in one or more of the data sources.

In an embodiment, translation may be performed as off-demand process (rather than on-demand or real-time process) before the GUIDs are accessed. For example, a translation service provider may be activated to convert data from one protocol to another protocol and convert GUIDs of a data source from an existing format to a new format. In such an implementation, the data source functions as both the client and the data source. In an embodiment, the translation service executes as background task, running while clients are accessing data from the data sources. In an intelligent implementation, the translation service provider performs cache translation, translating portions of data and GUIDs in anticipation of the clients' needs to access them. Cache translation is similar to computer memory access caching or disk drive access caching, which fetches portions of data from memory or hard drive storage in anticipation of access.

Although this application discusses specific software identifiers known in the industry as UUIDs and GUIDs, one of skill in the art will recognize that the invention will apply to a broad range of software identifiers, not only UUIDs and GUIDs. Software identifiers including UUIDs and GUIDs come in a number of different formats. UUIDs and GUIDs are 128-bit (16-byte) identifiers with an extreme likelihood of uniqueness across space and time, and are computationally difficult to guess. The terms UUIDs and GUIDs are used interchangeably in this application to refer to a particular type of software identifier.

The UUID specification is described in, for example, Request for Comments (RFC) 4122; Open Software Foundation's Distribution Computing Environment (OSF DCE) 1.1; International Telecommunication Union's ITU-T Recommendation X.667; and International Organization for Standardization's ISO/IEC 11578:1996 on Information Technology—Open Systems Interconnection—Remote Procedure Call. These references are incorporated by reference along with all other reference cited in this application.

UUIDs or GUIDs are typically used to identify software modules, database objects, web services, network devices, and hardware components. UUIDs can also be used in any applications that require unique identification of physical objects, intangible objects, or clusters of information. For example, a GUID may be used as a key to a database object, an identification of a specific web page, or a field stored in a RFID tag. For clarity, the present invention is described with either UUIDs or GUIDs. However, the present invention encompasses UUIDs, GUIDs, and other equivalent forms of unique identifiers.

Due to the myriad of formats, a problem with UUIDs and GUIDs is the lack of transparency and interoperability. UUIDs are created to be used in a network environment where there are potentially many computing clients and servers. While many clients and servers are designed to generate and store UUIDs, these systems are commonly created to understand and work with different proprietary formats such as binary in one data store, a hexadecimal string in another, and series of octets in a third. Even when two data sources store GUIDs in hexadecimal strings, for example, one data source may store the hexadecimal strings with a number of separator characters while another data source may not use any separator characters or uses a different number of separator characters. One system does not understand the UUID format of another system, even if the UUIDs of both systems are the same values.

In a specific implementation, the translation service provider understands or recognizes the different formats of GUIDs each client accepts and each data source stores and translates accordingly. The translation service provider may automatically detect the format of a GUID flowing through it. In addition or in the alternative, a system administrator may configure the translation service provider by specifying the formats of GUIDs provided by the connected back-end data stores and specifying the formats of GUIDs accepted by the connected client applications. In an embodiment where a translation service provider may automatically detect the format of a GUID, a system administrator may be given the capability to override the autodetection and specify a format of the GUID different from an autodetected format.

The UUID specification defines several formats—the combinations of the different variants, different versions, and different representations. The specification defines at least four variants of layout for the UUID bit structure. The specification also defines at least five versions. Each version defines a different base for generating the UUID content. Version 1 is based on time; version 2 is for use in security; versions 3 and 5 are based on cryptographic hashing functions; and version 4 is based on random number generation.

In addition, a UUID can be represented as a binary number, a string of hexadecimal digits, a single integer value, or even a series of octal numbers. Complicating the formats further, some UUID providers store UUIDs as 32-character strings. Some providers store UUIDs with three hyphens as 35-character strings. Other providers add four hyphens to make 36-character strings. Hyphens are not guaranteed to be at any fixed positions. Furthermore, there are no restrictions on the number of hyphens or other separating characters, and the positions of these separating characters.

In a specific embodiment, the translation service provider is programmed or configured to provide translation of GUIDs from and to any two or more formats. For example, the translation service provider may be programmed to handle a 32-character string, a 35-character string, a 36-character string, or string in another length, or any combination of these. The formats handled may be a binary number, a string of hexadecimal digits, a single integer value, or a series of octal numbers, or any combination of these.

In a specific implementation, an example of a translation the translation service provider provides is translating from format 1 (e.g., Oracle Virtual Directory (OVD)) to format 2 (e.g., iPlanet). The translation service provider is programmed or configured to translate between GUIDs in format 1 (e.g., a string of 32 hexadecimal characters) and format 2 (e.g., a 35-character string of 32 hexadecimal characters plus three separator characters).

For example, a GUID in format 1 is "3a4492d31e4511da80cdb081c2c1afda." Format 1 is referred to as orclGUID in OVD. A GUID in format 2 is "3a4492d3-1e4511da-80cdb081-c2c1afda." Format 2 is a string of four groups of 8 hexadecimal characters with three hyphens, one hyphen in between any two groups. Format 2 is referred to as nsuniqueid in iPlanet and other Sun Microsystems data sources such as its LDAP directory server.

The translation or conversion reformats the GUID from format 1 to format 2, and vice versa. To translate a GUID from format 1 to format 2, the translation service provider inserts three hyphen characters, one after the eighth, sixteenth, and twenty-fourth hexadecimal character of the format 1 GUID. To translate a GUID from format 2 to format 1, the translation service provider removes all three hyphen characters from the format 2 GUID.

In a specific embodiment, the clients expect GUID in format 1. If the data sources provide GUIDs in a format other than format 1, the translation service provider dynamically converts the GUIDs to those in format 1. The translation service provider does not store the converted GUIDs locally. In other implementations, the translation service provider stores the converted GUIDs locally. In such implementations where previously converted GUIDs are stored locally, a virtual directory (e.g., OVD) may select to return the locally stored GUIDs instead of activating the translation service provider to translate the different-formatted GUIDs from the back-end data stores.

In a specific embodiment, the host is a virtual directory (e.g., Oracle Virtual Directory) including a translation service provider of the invention. One or more client applications may be an application server (e.g., Oracle Application Server (OAS)). The virtual directory (e.g., OVD) provides a single user interface or application interface for accessing user objects stored in a variety of back-end data sources such as an OID, LDAP, Microsoft Active Directory, Sun ONEiPlanet Directory, Java System Directory Server, general databases, or any legacy systems.

The back-end data sources may store GUIDs in different formats or may not store GUIDs (see the discussion on missing GUIDs below). Regardless of the different possible GUID formats, or the lack of GUIDs, the single interface ensures, with respect to GUID format, that the OVD will return GUIDs in the format required or expected by an application. For example, the OVD returns GUIDs in a string of 32 hexadecimal digits (format 1).

In a specific implementation, the translation service provider is programmed or configured to handle translation of GUIDs from format 1 to format 3 (i.e., a 128-bit or 16-byte value), and vice versa. Format 3 is referred to as objectGUID in Microsoft Active Directory and other Microsoft data sources including the Microsoft Exchange Server. The following flow may be used to translating between GUIDs in format 1 (e.g., OVD) and format 3 (e.g., Active Directory (AD)). To translate from format 3 to format 1:

1. Divide the 128-bit (16-byte) value of a GUID in format 3 into 16 individual bytes.
2. Type cast each byte (8-bit) of value into an integer.
3. Perform a logical AND operation on each byte of integer with 0xFF.
4. Convert each ANDed byte of value into two hexadecimal characters.
5. Concatenate the 16 bytes of hexadecimal characters into a string of 32 hexadecimal characters (format 1).

To translate from format 1 to format 3:
1. Divide the 32 characters of hexadecimal string into 16 pairs of 2-hexadecimal sub strings.
2. Convert each of the 2-hexadecimal substrings to an integer.
3. Convert each integer into a byte value.
4. Form a 16-byte value with the 16 converted bytes (format 3).

In a specific embodiment, a virtual directory hosts a translation service provider that provides translation from format 1 (e.g., orclGUID) to format 2 (e.g., nsuniqueid), and vice versa. In another implementation, the translation service provider provides translation from format 1 to format 3 (e.g., objectGUID), and vice versa. In another implementation, the translation service provider provides translation format 2 to format 3, and vice versa. Alternatively, the translation service provider provides translation services between format 1, format 2, and format 3.

A client accepting GUIDs in a format (e.g., format 1, format 2, or format 3) handled by the translation service provider may connect to the virtual directory and expect data from the OVD to have GUIDs in the client's specific format. Data sources that store data with GUIDs in a format (e.g., format 1, 2, or 3) handled by the virtual directory may connect to the virtual directory. The virtual directory automatically detects the different formats of GUID.

In an alternative embodiment, the virtual directory is configurable to associate a GUID format to a connected client or data store. A client may send requests that contain GUID in the client's specific format. Regardless of the client-specific formats, a data store will receive the requests with GUIDs in a format native to the specific data store. A request may be a data request, a search request, a query request, a request to store data, or any other request that is understood and accepted by the virtual directory.

GUID formats 1, 2, and 3 are described for illustrative purposes only, and the present invention is not limited to these formats. The translation service provider may be programmed or configured to handle different formats or additional formats. Changes or additions to the translation service provider may be via replacement of or additional software, plug-ins, modules, drivers, or firmware. For example, a user may input new translation or conversion rules in a rules screen of the translation service provider. In other embodiments, changes to the translation service provider can be achieved by changing combination of switches either physical switched or software switched such as the registry settings in a Microsoft Windows environment.

Figure 4:
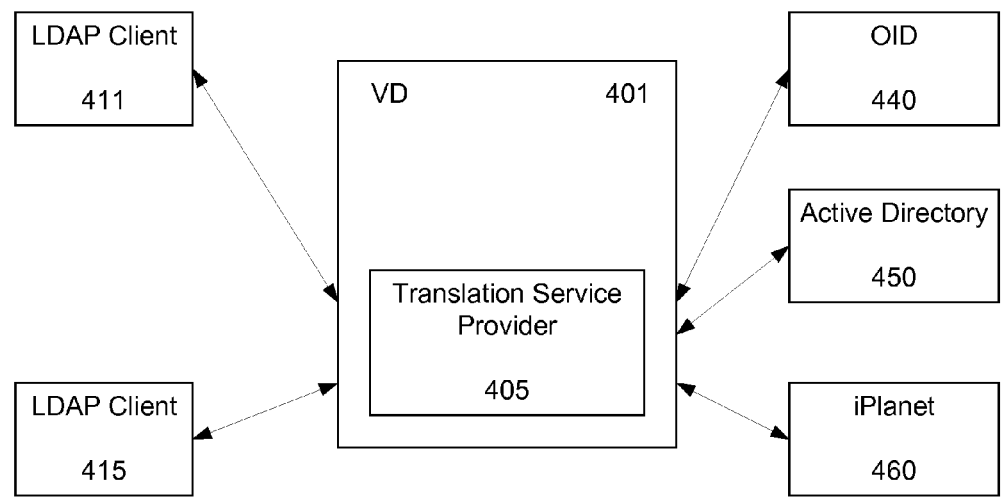
FIG. 4 shows an application of a translation service provider of the invention to facilitate clients having a specific directory interface to work with one or more directories providing information in different formats.

FIG. 4 shows an application of a translation service provider of the invention to facilitate clients having a specific directory interface to work with one or more directories providing information in different formats. As a specific example, clients 411 and 415 connect have only an LDAP access interface. The LDAP clients 411 and 415 connect to a virtual directory 401, which includes a translation service provider 405. Three LDAP directory servers 440, 450, and 460 connect to the virtual directory.

In this example, each of the directory servers is shown as a different type of LDAP directory. OID 440 is a directory such as Oracle Internet Directory that stores GUIDs in format 1 (e.g., orclGUID). Active Directory 450 such as Microsoft Active Directory stores GUIDs in format 3 (e.g., object-GUID). The iPlanet directory 460 stores GUIDs in format 2 (e.g., nsuniqueid). In a system, there may be fewer than three or more than three directories. Two or more directories may be of the same LDAP type or each directory may be of a different LDAP type. There may be one or more non-LDAP directories connected to the virtual directory.

A client accesses data from a single data store. In an embodiment, when a client or data source is connected to the virtual directory, the virtual directory automatically detects the format of GUID each client or data source handles. Alternatively or additionally, an administrator of the virtual directory may configure the virtual directory to indicate the format of GUID the client or data source understands. If needed, the administrator changes some registry settings or uploads additional software, plug-ins, modules, drivers, or firmware to allow the translation service provider in the OVD to perform translation between any two or more formats. The OVD acts as an information switch or router, directing data from each connected data source to the client requesting the data.

The virtual directory enables client applications to access data stored in different directories with a single access interface. For example, the client access interface is a type of LDAP interface. Clients 411 and 415 are designed to access a LDAP directory with a particular format of GUIDs. For example, client 411 may only accept data with GUIDs in format 1 (e.g., orclGUID) while client 415 may only accept data with GUIDs in format 2 (e.g., nsuniqueid).

The translation service provider enables each client to request data from any one of the directories as if these directories provide data with GUIDs in the format expected or native to the accessing client. For example, client 411 expects GUIDs in format 1 and may request data from Active Directory 450, which stores GUIDs in format 3. To service a request from client 411 for data from directory 450, the virtual directory receives the data from directory 450 with one or more GUIDs in format 3. The virtual directory then invokes the translation service provider to translate the GUIDs into those in format 1 before passing the data and the translated GUIDs to client 411. In another embodiment, the virtual directory may store the translated GUIDs locally for future access.

In a reverse direction of data flow, when client 411 sends data with GUIDs in format 1 to for storing in directory 450, the virtual directory invokes the translation service provider to translate or convert the GUIDs into format 3 before sending the data with the translated GUIDs to directory 450.

Similarly, if client 411 requests data with GUIDs from the iPlanet directory 460, the translation service provider translates the GUIDs from format 2 to format 1 before sending the data with the translated GUIDs to client 411. In the reverse direction, the translation is from format 1 to format 2. When client 415 accesses data from Active Directory 450, the two formats involved in the translation are format 3 and format 2.

In some client and data source combinations, there may be no need to translate GUIDs. In the above example, when client 411 communicates with the OID 440, translation is not needed since both client 411 and OID 440 deal with GUIDs in format 1. Similarly, translation is not needed when client 415 communicates with iPlanet 460, both of which handle GUIDs in format 2. Therefore, in some embodiments, the translation service provider 405 or the host 401 performs a format comparison before deciding whether GUID format translation is needed. In these embodiments, the translation service is provided when it is needed.

Without a translation service provider of the invention, client 411 is limited to communicating only to the OID 440 data source. Similarly, client 415 is limited to accessing data from the iPlanet server 460 data source. With the translation service embodying the present invention, different types of LDAP data stores OID 440, Active Directory 450, and iPlanet 460 may be connected to the OVD to provide data to clients that expect GUIDs in a different format. Although each data source, as shown, stores GUIDs in a different format, each of the clients 411 and 415 receives GUIDs in the client's specific format.

Figure 5:
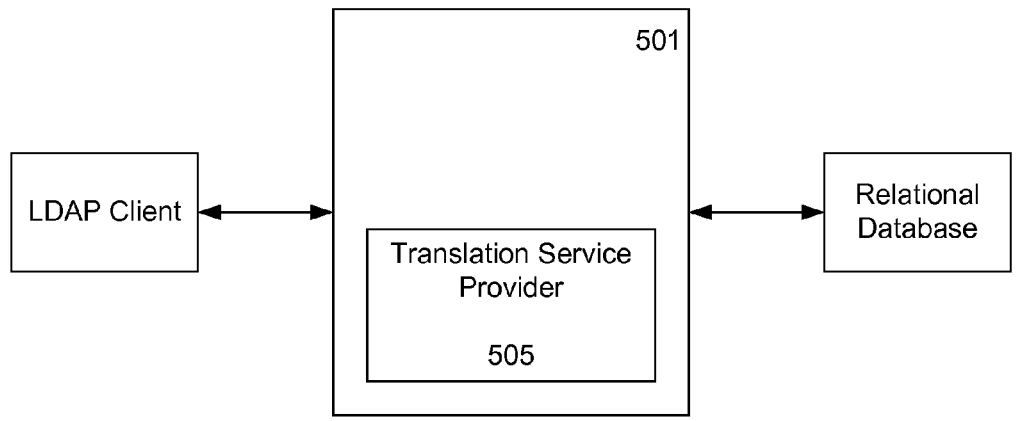
FIG. 5 shows a system with a translation service provider supporting data translation between protocols.

FIG. 5 shows a system with a translation service provider supporting data translation between protocols. Many client applications understand only a single interface or protocol for accessing data. Speaking only one protocol effectively locks these applications out of data stored in different protocols.

For example, a client application may only "speak" LDAP, DSML, JDBC, or another protocol. The client is locked out from accessing, for example, data from a LDAP directory. Even within a single protocol, such as LDAP, there may be different versions of the protocol. A service provider that is able to translate data to the protocol used by a client application enables these clients to access more data and enables data stores to serve more clients.

In an embodiment, the translation service provider translates more than the GUID formats. It also translates data from and to different protocols (e.g., LDAP, ODBC, JDBC, DSML, and others) and translates data from and to different versions of a communication protocol. For example, a client may be a Lightweight Directory Access Protocol (LDAP) version 2 application accessing data stored in LDAP version 3.

The data may be stored in another protocol such as X.500 (DAP), Directory Service Markup Language (DSML), Lire DLD Schema Markup Language (LDSML), Open Database Connectivity (ODBC), Java Database Connectivity (JDBC), IBM DB2, SQL server or another protocol. In other embodiments, the GUID format translation and data protocol translation may be performed by separate services. For example, the host or another service provider performs the protocol translation while the translation service provider performs the GUID format translation.

In FIG. 5, the system provides both GUID format translation and data protocol translation. To simplify the figure, only one client and one data source are connected to the virtual directory 501. The virtual directory has a translation service provider 505. In an implementation, there may be two or more clients and two or more data sources. Each client may be "talking" to a different data source, or two or more clients may be talking to the same subset of data sources.

In an embodiment, the client is an LDAP application. The client is limited to access data from an LDAP data store and may not connect directly to a data store of a different type without some form of translation service. Here, the data source is a relational database, such as a JDBC server. If the relational database does not use GUIDs, the only translation service needed is between the relational database protocol and the LDAP protocol. If the relational database uses GUIDs, GUID format translation may also be needed if the format stored in the database and the format expected by the client is different.

The client sends a request for data that contains GUIDs in a format foreign to the client. If the request is in a form understood by the relational database server, the virtual directory passes the client request to the database server. If the request is in a form not understood by the database server, the virtual directory translates the LDAP request to a database request before passing it to the database server. If the request cannot be serviced successfully, the service may return only a status code such as an error code. If the database server is able to service the request, the virtual directory then receives data from the database server, with or without an accompanying status code. The data includes one or more GUIDs.

The virtual directory then translates the data to that in the LDAP protocol understandable by the client. The virtual directory also activates the translation service provider to translate the GUIDs from the format stored in the database to the format the client understands. Alternatively, the virtual directory may activate the translation service provider to translate both the database protocol and the GUID format.

In other embodiments, either the protocol translation or the GUID format translation or both translations may not be needed. In such cases, GUID format translation is performed only after determining the formats used by the client and database are different. Similarly, protocol translation is performed only after a comparison on the protocols used by the client and the data source reveals the protocols are different. Alternatively, an administrator may manipulate some settings in the virtual directory to turn on or turn off protocol translation. After the translations, the virtual directory sends the translated data and GUIDs to the client along with the service status code from the database server.

In a reverse direction of data flow, the LDAP client sends data to store in the relational database. The data is translated from the client's LDAP protocol to the database protocol of the data store. GUIDs are also translated from the client's specific format into the format store in the database. Again, in other implementations, comparisons may be done to determine whether one or both of the translations are needed. Alternatively, the system administrator may turn on or turn off one or both of the reverse translations. The translated data and translated GUIDs are then passed to the database server for storage.

A translation service provider may provide translation of data protocols or versions of a protocol, or both, to only one direction of communication flow. Two or more translation service providers may be deployed to serve translation to both directions of data flow. Each translation service provider may be configured to translate only the GUID formats or the data protocols or versions. A translation service provider may be configured to translate both the GUID formats and data protocols or versions. In other embodiments, the protocol/version translation may be provided by the host service provider.

In another embodiment, a virtual database is hosting a translation service provider. A client connected to the virtual database may be a relational database application or another non-LDAP application. The data source connected to the virtual database may be a LDAP server. The database administrator configures the virtual database to enact translation of data from and to the LDAP protocol and relational database protocol. The translation service provider provides any necessary GUID format translation between the client and the data source. The database client connected to the virtual database is able to access the LDAP directory as if it were a relational database. The LDAP server is able to serve the client as if it were LDAP client.

An aspect of the invention is aggregating data from different databases or virtual databases. In many situations, it may be desirable to combine data from different sources, stored in different protocols. For example, when a company merges with another, the employee databases of both companies need to be combined for human resource and other applications. These databases may be of different types, storing data in different protocols. Merging the databases physically (e.g., copying data from different sources into a single storage and translating data from different protocols into a single data protocol) may be cost prohibitive or not feasible for a number of reasons. A better alternative is to use a translation service provider to form virtual databases from the existing data of different type of data stores.

Creating virtual databases or virtual directories from data stores of different types requires the capabilities to translate data protocols, translate GUID formats, as well as aggregating data from more than one data source. A service provider with these capabilities enables client applications that speak single protocol to access data stored in different protocols and access data stored in more than one data source.

Figure 6:
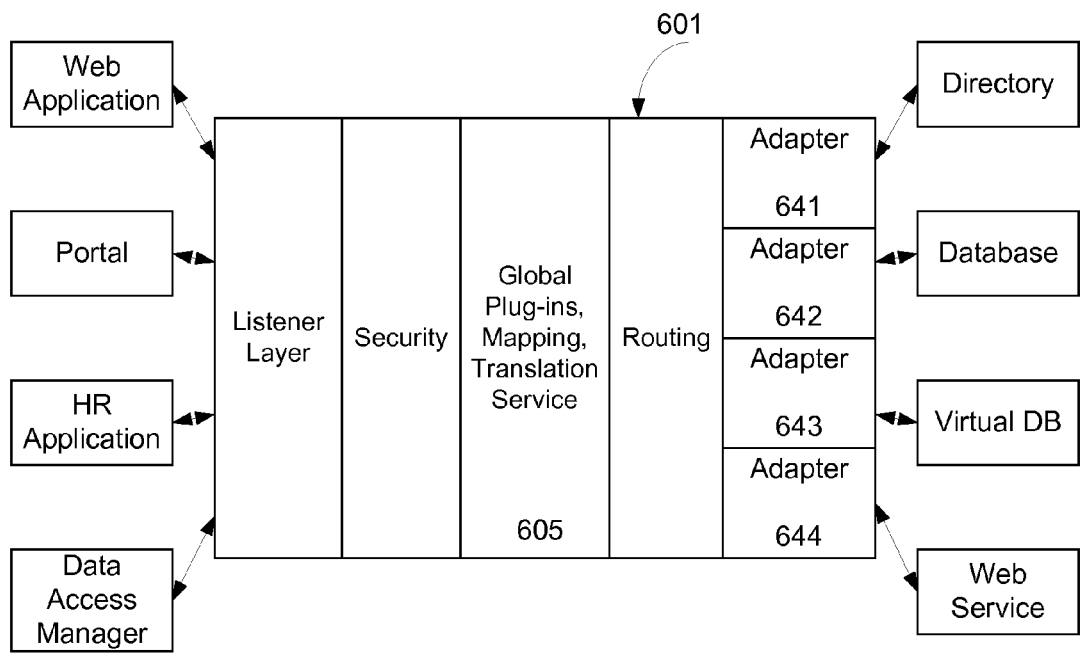
FIG. 6 shows some architectural layers used in implementing a translation service provider.

FIG. 6 shows some layers used in implementing a translation service provider. FIG. 6 shows a block diagram of a specific embodiment of the enabling translation service provider. The translation service provider is hosted by a virtual directory 601, such as a virtual directory (e.g., OVD). The translation service provider 605 provides translation to both GUID formats and data protocols. The virtual directory comprises a plurality of service "layers." These are logical layers that facilitate the discussions and administrations of subservices within a single virtual directory service.

The first layer is a listener layer. The listener layer is the layer at which socket-level protocol such as LDAP, DSML, LDSML, HTTP, JDBC is spoken. On top of the basic socket-level protocols, the listener layer also supports communication encryption/decryption such as the Secure Sockets Layer/Transport Layer Security (SSL/TLS). The LDAP layer also has the ability to support LDAP-Simple Authentication and Security Layer (SASL) to handle digital certificate authentication. The listener may hand off a client request to a worker thread which handles further processing, such as determining which action to take such as a search or update or translating data from one protocol to another protocol. In an alternative embodiment, the protocol translation may be performed in another layer such as the mapping or plug-in layer. This is discussed further below.

After an operation is determined, the next layer, a virtual directory security layer, performs one or more levels of security checks. For example, the checks may include making sure the request is authorized, is not in violation inbound access controls or any Denial of Service policies.

The security level serves another crucial function in a multiclient, multisource environment. The function is to limit a certain client to a certain "virtual view" of data. Each client has its own specific attribute requirements in accessing data. For example, a human resource (HR) application may need access to the compensation data of an employee while a training coordinating application may not have the same access. Even from the same client, different users may be limited to different views of the virtual data. For example, an HR manager may need access to the compensation data of an employee while a HR staff may not have the same access. The security level service may limit a user or a application, or both, only to the virtual views of data they are entitled to access. Other users or client applications never know about these specific attributes or directory structure and have access to their specific views of data.

If a request satisfies the in-bound security requirements, a next step is to invoke any global level mappings and plug-ins. Mapping and plug-ins have the ability modify the operation such as changing the name or value of attributes. The translation service provider may be deployed as a plug-in to translate GUID formats and data protocols. In other embodiments, the translation service provider may be implemented with another layer. Alternatively, the GUID format translation and data protocol translation may be done in separate layers. In other deployments, either the GUID format translation or data protocol translation or both may be omitted.

The next routing layer determines which adapters can handle the client request. In the case where multiple adapters can support the request, the virtual directory may selectively perform the operation on one or more or all adapters. The order of precedence is configurable based on priority, attributes, or supported search filters such as LDAP search filters.

Once an adapter is selected, the next step is to invoke any "inbound" adapter level plug-ins, which are like global plug-ins except operate only on the specific adapter. The adapter translates the virtual directory request into an operation that maps to its specific adapter level protocol. Depending on the protocol, there may be very little translation, straight forward mapping translation, or translating the request to a request into another protocol. For example, and LDAP request may be translated into an SQL call or method that matches that of a custom adapter such as a web service call.

The adapters, shown as adapters 641, 642, 643, and 644, are the adapter level plug-ins that communicate to the back-end data sources. There may be one adapter to each type of data source or one adapter to each data source, where multiple data sources of the same type communicate to multiple adapters. Since there may be any numbers of data sources connected to a virtual server, there may be any numbers of adapters.

After the operation is performed, the resulting data proceeds in reverse order back to the client. In nonsearch operations, normally there is no further processing, as only error codes resulted from the operations. In a search operation where data is returned, global plug-ins such as the translation service provider and access control filtering are invoked to process the data. If needed, the translation service provider translates GUIDs returned with the data to the format specific to the requesting client. In some embodiments, the translation service provider may also translate the returned data from one protocol to another or from one version of a protocol to another version.

The security level may or may not perform additional security checks on the returned data. Finally the listener level will make sure the data is returned to the requesting client. If protocol translation is required and not done by the translation service provider or another layer, the listener level performs the translation.

There may be one or more client applications connected to the virtual server. For example, FIG. 6 shows four clients, a web application, a portal, an HR application, and an access manager that facilitates data access to yet more clients. The architecture of the virtual server enables the client applications to deploy, along with other advantages, only single sign-on (SSO) mechanisms to access the plurality of different back-end data sources.

Another advantage is the scalability of the virtual directory. At a small scale, the virtual directory with the translation services can be deployed to match a client speaking one data protocol to a data source speaking another protocol or version of a protocol. At a large scale, the virtual directory may be deployed in multiply machines to serve many clients, each speaking a different protocol.

The virtual directory also allows multiple data sources of different protocols to be connected to serve client applications, that otherwise would not be possible to access these data in different protocol without changes made to the clients or data stores. The OVD, with the translation service, provides connection multiplexing and transactional load balancing for an infrastructure of multiple clients accessing data from multiple sources stored in multiple protocols.

As an example, the virtual directory is connected to by four data sources. The connected directory may be an LDAP directory such as that from Oracle, Microsoft, Novell, IBM, Sun, or an open-source supplier. The connected database may be a relational database, an ODBC server, a JDBC server from Oracle, IBM, Sun, Microsoft, or another vendor. The virtual directory is yet connected to another virtual database or directory. The virtual directory may be deployed with a custom adapter plug-in that accesses data from another web service such as an extranet directory.

Figure 7:
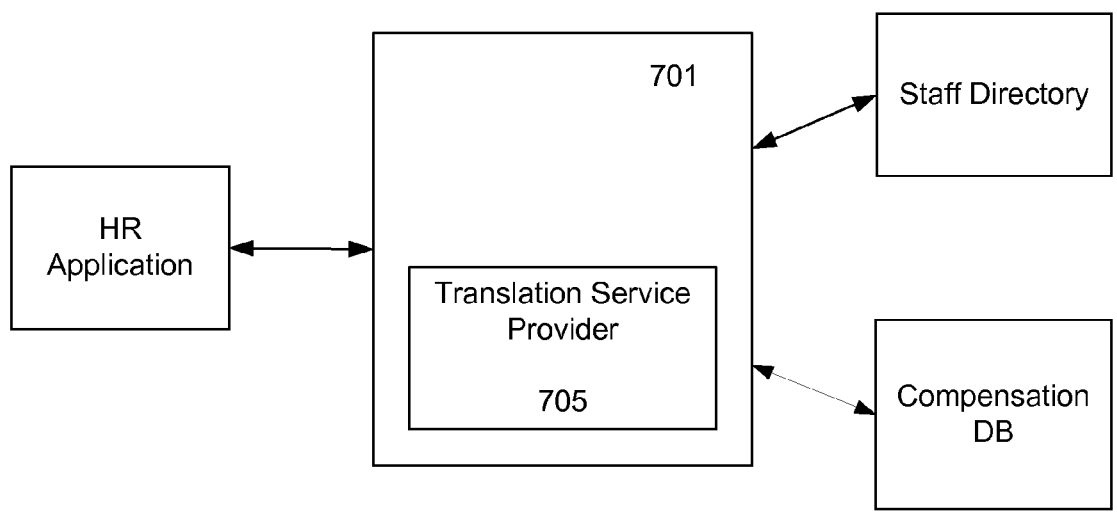
FIG. 7 shows a system where a data source is deployed regardless of protocol.

FIG. 7 shows a system where a data source is deployed regardless of protocol. A specific embodiment of a virtual directory 701 (e.g., OVD) aggregates data for a client, which is an HR application. The virtual directory includes a translation service provider 705. The client application accesses data from a staff directory running, for example, on a Sun Microsystems LDAP server and a compensation database running, for example, on a Microsoft relational database server.

The client may be a single sign-on application. However, single sign-on capability is not required for data aggregation. The virtual directory performs the necessary services in each level according to the description above. For simplicity, only the services directly pertain to data aggregation is described here.

When a user logs on to the HR application, a service at the security level authenticates the HR application's access and the user's logon. The user's requests may need data from one of the connected data sources or may need data from two or more data sources. The virtual directory, through the security level service, form data views based on the accessing application and the accessing user. For example, when a payroll staff logs on to enter a compensation information for a pay period, the security level service grants the payroll staff access to both the staff directory and compensation database. However, accessing the compensation database is granted only to the extent for entering the payroll information. If the logon indicates the user is a HR manager, the user may be granted access to other fields of the compensation database.

Data views are also formed based on the accessing client. For example, if there is a sales application (not shown) connected to the virtual directory, the virtual directory may grant a user, who logs on through the sales application, access to other parts of the compensation database. In this example, the user may be granted access to specific sales compensation information that a user logs on though the HR application does not have access.

Based on a user's request, the virtual directory determines which back-end data sources have the requested data and forms requests to those data sources. If needed, the virtual directory translates the requests to those in the protocol local to the data sources. The virtual directory also activates the translation service provider to translate any client issued GUIDs into those in the formats used by the data sources.

The virtual directory then receives data, which may contain GUIDs, from these data sources. Each data source may store data in a different protocol. In FIG. 7, the staff directory is a LDAP directory while the compensation database is a relational database. The virtual directory then translates the data from the data source protocols to the protocol accepted by the client.

For example, if the HR application is in a third protocol, both the staff directory data and the compensation data need to be translated. However, if the HR application is in one of the data source protocol, LDAP for example, only the compensation data needs to be translated. In addition, any GUIDs returned by the data sources need to be translated into the format accepted by the HR application. The OVD activates the translation service provider to do the translation. Again, if the GUIDs from one data source are already in the format accepted by the client, GUIDs from that source do not need to be translated.

The OVD then sends the translated data and translated GUIDs to the requesting application. To the requesting application, data came from only one source, the OVD. Also, data and the GUIDs within are always in the protocol and format expected and accepted by the requesting client.

An aspect of the invention is resolving GUID conflicts with aliases after aggregation. Although GUIDs have an extreme likelihood of uniqueness across space and time, the uniqueness is not guaranteed. Two GUIDs from two data sources may be the same before translation or the same after translation.

For example, the embodiment in FIG. 7 may have a second LDAP directory (not shown) connected to the virtual directory in addition to the Sun LDAP directory. The two directories are not guaranteed to always store GUIDs that are unique from each other. Even when two directories store GUIDs in different formats, the GUIDS from one directory are not guaranteed to be unique from those of the other directory after translation.

For example, the Sun LDAP directory may store a GUID in format 2 (e.g., 3a4492d3-1e4511da-80cdb081-c2c1afda). The second LDAP directory may store a GUID in format 1 (e.g., 3a4492d31e4511da80cdb081c2c1afda). The two GUIDs are the same after translating them to any GUID format such as format 1, 2, or 3.

In an embodiment where the translation service provider is deployed with two or more back-end data sources, the translation service provider is instructed to detect duplicate GUIDs before or after translation, or both. If duplications occur, the translation service provider can generate alias GUIDs for the data from one data source and associate the generated alias GUIDs to the data of that source. This association may be done via the database join mechanism or other method. The generated GUIDs may be stored locally within the translation service provider, the host, or request the data source to store them.

In FIG. 7, for example, the two data sources may store duplicate GUIDs. In servicing a client's request, the OVD may receive one GUID from the database which is the same as another GUID from the LDAP server. The OVD may determine the duplications before translations of the GUIDs or after the translations. When duplication occurs, the OVD generates an alias unique identifier that is different from the duplicated GUIDs. The OVD may associate the alias with the LDAP server or the database. For example, if the alias is associated with the database, the GUID from the LDAP server and the alias are provided to the requesting client. The GUID from the database is not provided to the client.

An aspect of the invention is providing GUIDs not available from a data store. One or more data sources, such as a legacy system, may not store GUIDs or store GUIDs in a format that translation is not available. In some embodiments, the translation service provider or its host such as a virtual directory may take care of back-end data stores that do not support GUIDs or support GUIDs in a format not recognized by the translation service provider.

Referring to FIG. 7, as an example, the relational database does not provide GUIDs. In servicing a client request, the virtual directory receives data from the database that does not include any GUID. The virtual directory or the translation service provider then requests the database for an identifier-type of data that can be used as an unique identifier. The virtual directory or the translation service provider will then convert or translate this identifier-type data to a GUID in a format expected by the requesting client. The virtual directory then provides the data from the database and along with the generated GUID to the requesting client.

The translation service provider or the host may store the newly generated GUID or request the database to store the newly generated GUID. Creating and storing newly generated GUIDs can be performed as needed. For example, when a client application requests data from the data store that does not provide GUIDs, the GUIDs are generated for the requested objects and stored.

Creating and storing of newly generated GUIDs may be performed outside the context of serving client requests or after serving client requests. In such situations, the translation service provider or its host will generate a GUID for each entry of record or object and save the newly generated GUIDs either locally or on the back-end data store.

In some embodiments, a virtual directory (such as the OVD) stores generated GUIDs or translated GUIDs locally or in newly created databases or directories in one or more back-end data sources. The virtual directory may associate or selectively associate the stored GUIDs with the corresponding back-end data objects or records through the join mechanism. The association may be done by other mechanisms such as creating new databases, indexes, views, or directories for the stored GUIDs. These embodiments may improve efficiency, provide data mirroring, or other incentives.

An aspect of the invention is enabling searching. In an embodiment of the present invention, the translation service provider enables client applications to search the back-end data sources regardless of the format the GUIDs are stored in the data sources.

A client issues a search request or another type of request that contains one or more GUIDs in the client's specific format. The request may be a simple look up of a particular object or record entry. Alternatively, the request may be more encompassing involving multiple objects and more than one data sources.

The translation service provider or its host determines whether the client request needs to be translated into a request in one or more protocols different from the one used by the client. If determination is affirmative, the translation is performed. Similarly, the translation service provider or its host determines whether the GUIDs contained in the request is in a format stored in a data source that needs to respond to the request.

If the client-specific format is incompatible with a data source, the GUIDs are translated to the data source's format. If a second, a third data source, or more data sources are responding to the request, the host or the translation service provider translates the GUIDs into the format of each data source as needed. The host then sends the client request to the required data sources to service the request.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
a computer processor performing the steps of:
intercepting a request from a client for data stored at a first data source;
determining at least one data source where the data resides, where the data resides at the first data source or a second data source, different from the first data source; wherein the first data source is configured to respond to a client request using a first communication protocol, and the second data source is configured to respond to a client request using a second communication protocol, different from the first communication protocol;
retrieving the data from the second data source;
obtaining a first identifier associated with the data, the first identifier being arranged to identify the data from the second data source, and being arranged in a first identifier format, wherein the first identifier format is a format for a globally unique identifier, and a value of the first identifier in the first identifier format is exclusively machine-generated;
determining if the first identifier format of the first identifier associated with the data from the second data source is different from a second identifier format, wherein the client is configured to receive an identifier in the second identifier format in response to its request, wherein the second identifier format is a format for a globally unique identifier, and a value of the first identifier in the second identifier format is exclusively machine-generated;

accessing a map indicating an identifier format, wherein the identifier format is associated with at least one of a data source or a client in a system;

when the first identifier format of the first identifier associated with the data from the second data source is different from the second identifier format, converting the first identifier into the second identifier format, wherein the converting is based on the map indicating an identifier format; and after the converting the first identifier into the second identifier format, sending the data and associated first identifier to the client, wherein the first identifier is in the second identifier format, the second identifier format is a second format for a globally unique identifier, and the second format for a globally unique identifier is different from the first format for a globally unique identifier.

2. The computer-implemented method of claim 1 comprising: accessing a map indicating where the data requested by the client resides.

3. The computer-implemented method of claim 1 wherein the map is selected from the group consisting of the first data source, the second data source, and the client.

4. The computer-implemented method of claim 1 wherein the map indicating the identifier format associated with at least one data source or at least one client in the system is generated on the fly.

5. The computer-implemented method of claim 1 wherein the first identifier format is a string of i hexadecimal characters, the second identifier format is a string of j hexadecimal characters including k separator characters, where j is greater than i, and the converting the first identifier into the second identifier format comprises:
inserting the separator characters at k different positions in the first identifier in the first identifier format.

6. The computer-implemented method of claim 1 wherein the first identifier format is a string of i hexadecimal characters including j separator characters, the second identifier format is a string of k hexadecimal characters, where i is greater than k, and the converting the first identifier into the second identifier format comprises: removing the j separator characters from the first identifier in the first identifier format.

7. The computer-implemented method of claim 1 wherein the converting the first identifier into the second identifier format comprises:
dividing an n-bit value of the first identifier in the first format into m first bytes, where each first byte has p bits;
type casting each first byte into an integer;
performing a logical AND operation on each first byte with 0xFF to obtain resulting second bytes; and
converting each second byte into two hexadecimal characters; and concatenating the hexadecimal characters into a string of hexadecimal characters.

8. The computer-implemented method of claim 1 wherein the converting the first identifier into the second identifier format comprises: dividing n characters of hexadecimal string into n/2 pairs of two-hexadecimal substrings; converting each of the two-hexadecimal substrings to an integer; converting each integer into a byte value; and forming a (n/2)-byte value with the n/2 converted bytes.

9. The computer-implemented method of claim 1 comprising:
intercepting a request from the client to store data at the second data source, the data comprising a second identifier in the second identifier format;
determining if the second identifier format is different from an identifier format associated with the second data source; if the second identifier format is different from an identifier format associated with the second data source, converting the second identifier into the identifier format associated with the second data source;
storing the data and associated second identifier at the second data source, wherein the second identifier is in the identifier format associated with the second data source.

10. The computer-implemented method of claim 1 wherein the first and second data sources are databases.

11. The computer-implemented method of claim 1 wherein the first and second data sources are different directory services.

12. The computer-implemented method of claim 1 wherein a virtual directory program converts the first identifier into the second identifier format.

13. The computer-implemented method of claim 1 wherein the request by the client for data is directed to the first data source and the request is intercepted, without knowledge of the client.

14. The computer-implemented method of claim 1 wherein the first identifier format is a first format for a GUID and the second identifier format is a second format for a GUID, and the second format for a GUID is different from the first format for a GUID.

15. A computer product comprising:
code stored on a non-transitory computer-readable storage medium which when executed by a computer processor performs the steps of:
intercepting a request from a client for data stored at a first data source;
determining at least one data source where the data resides, where the data resides at the first data source or a second data source, different from the first data source; code for retrieving the data from the second data source; wherein the first data source is configured to respond to a client request using a first communication protocol, and the second data source is configured to respond to a client request using a second communication protocol, different from the first communication protocol;
obtaining a first identifier associated with the data, the first identifier being arranged to identify the data from the second data source, and being arranged in a first identifier format; wherein the first identifier format is a first format for a globally unique identifier;
determining if the first identifier format of the first identifier associated with the data from the second data source is different from a second identifier format, wherein the client is configured to receive an identifier in the second identifier format in response to its request;
accessing a map indicating an identifier format, wherein the identifier format is associated with at least one of a data source or a client in a system;
translating the first identifier into the second identifier format when the first identifier format is different from the second identifier format, wherein the translating is based on the map indicating an identifier format; and
sending the data and associated first identifier to the client after the translating the first identifier into the second identifier format, wherein the first identifier is in the second identifier format, the second identifier format is a second format for a globally unique identifier, and the second format for a globally unique identifier is different from the first format for a globally unique identifier.

16. The computer product of claim 15 comprising:
code stored on a non-transitory computer-readable storage medium which when executed by a computer processor performs the steps of:
intercepting a request from the client to store data at the second data source, the data comprising a second identifier in the second identifier format, the second identifier being arranged to identify the data;
determining if the second identifier format is different from an identifier format associated with the second data source;
translating the second identifier into the identifier format associated with the second data source when the second identifier format is different from the identifier format associated with the second data source;
storing the data and associated second identifier at the second data source, wherein the second identifier is in the identifier format associated with the second data source.

17. The computer product of claim 15 wherein translating the first identifier into the second identifier format comprises inserting separator characters into the first identifier in the first identifier format.

18. The computer product of claim 15 wherein the first and second identifiers are GUIDs.

19. The computer product of claim 15 wherein the first data source is a database.

20. The computer product of claim 15 wherein the code for translating the first unique identifier into the second identifier format is stored at the first data source.

21. The computer product of claim 15 wherein the map is selected from the group consisting of the first data source, the second data source and the client.

22. The computer-implemented method of claim 1 wherein the first data source is associated with a different identifier format from the second data source.

23. The computer-implemented method of claim 1 wherein the first data source is configured to respond to a client request using a first communication protocol, and the second data source is configured to respond to a client request using a second communication protocol, different from the first communication protocol, and the method comprises: upon receiving a first response from the second data source, converting the first response into a second response that is in the first communication protocol; and transmitting the second response to the client over a network.

24. The computer product of claim 15 further comprising:
code stored on a non-transitory computer-readable storage medium which when executed by a computer processor performs the step of: requesting from the client an identifier format the client is configured to receive.

25. The computer-implemented method of claim 1 wherein the first identifier in the first identifier format has an equivalent value to the first identifier in the second identifier format.

26. The computer-implemented method of claim 1 wherein means for converting the first identifier into the second identifier format is stored at the first data source.

* * * * *

UNITED STATES PATENT AND TRADEMARK OFFICE
CERTIFICATE OF CORRECTION

| | | |
|---|---|---|
| PATENT NO. | : 7,970,943 B2 | Page 1 of 1 |
| APPLICATION NO. | : 11/838537 | |
| DATED | : June 28, 2011 | |
| INVENTOR(S) | : Lin et al. | |

It is certified that error appears in the above-identified patent and that said Letters Patent is hereby corrected as shown below:

In column 15, line 52, delete "sub strings." and insert -- substrings. --, therefor.

In column 25, line 5, in Claim 1, delete "identifier,and" and insert -- identifier, and --, therefor.

In column 26, line 25, in Claim 13, delete "by" and insert -- from --, therefor.

In column 26, line 26, in Claim 13, delete "intercepted," and insert -- intercepted --, therefor.

In column 26, line 36, in Claim 15, delete "of :" and insert -- of: --, therefor.

In column 26, line 41, in Claim 15, delete "source; code for" and insert -- source; --, therefor.

In column 27, line 8, in Claim 16, delete "of :" and insert -- of: --, therefor.

In column 28, line 1, in Claim 20, after "wherein" delete "the code for".

In column 28, line 2, in Claim 20, delete "first unique" and insert -- first --, therefor.

In column 28, line 6, in Claim 21, delete "source" and insert -- source, --, therefor.

Signed and Sealed this
Fifteenth Day of November, 2011

David J. Kappos
*Director of the United States Patent and Trademark Office*